United States Patent [19]

Lawrence et al.

[11] 4,351,424
[45] Sep. 28, 1982

[54] COMBINED CLUTCH AND BRAKE

[75] Inventors: Randall K. Lawrence, Fairview; Aaron A. Stevens, Spring Hill, both of Tenn.

[73] Assignee: The Murray Ohio Manufacturing Co., Brentwood, Tenn.

[21] Appl. No.: 149,931

[22] Filed: May 14, 1980

[51] Int. Cl.³ ............................................. B60K 41/24
[52] U.S. Cl. ..................................... 192/18 R; 56/11.3
[58] Field of Search ............... 192/18 R, 18 A, 48.91, 192/12 R, 14, 15, 107 R, 65, 66; 56/11.3, 11.7, 11.8

[56] References Cited

U.S. PATENT DOCUMENTS

| | | | |
|---|---|---|---|
| 2,454,917 | 11/1948 | Geddes | 192/18 R |
| 3,802,170 | 4/1974 | Seifert et al. | 56/11.8 |
| 3,871,159 | 3/1975 | Shriver | 56/11.3 |
| 3,878,926 | 4/1975 | Adachi | 192/18 R |
| 3,897,678 | 8/1975 | Zurek et al. | 56/11.3 |
| 3,908,344 | 9/1975 | Zurek et al. | 56/11.3 |
| 4,041,679 | 8/1977 | Seifert et al. | 56/11.3 |
| 4,141,439 | 2/1979 | Lunde et al. | 192/18 R |
| 4,226,313 | 10/1980 | Meldahl et al. | 192/18 R |

*Primary Examiner*—George H. Krizmanich
*Attorney, Agent, or Firm*—Cushman, Darby & Cushman

[57] ABSTRACT

An assembly for effecting driving or braking of a rotatable working element hich tube may be operatively connected to the powered rotary shaft, and passes through a central bore in the adaptor plate and has a collar that is dimensioned so that it cannot pass through the central bore. A spring biases the adaptor plate and drive plate apart. When the adaptor plate is connected to a working element, such as a rotary lawn mower blade, and the adaptor tube and drive plate are connected to the rotary shaft, by moving the adaptor plate with respect to the drive plate and a stationary housing portion in a direction parallel to the rotary shaft, braking or clutching is provided by engagement of a friction ring with the housing portion or drive plate, respectively. The adaptor tube, actuation plate, adaptor plate, and drive plate comprise a subassembly for ease of construction and mounting.

26 Claims, 8 Drawing Figures

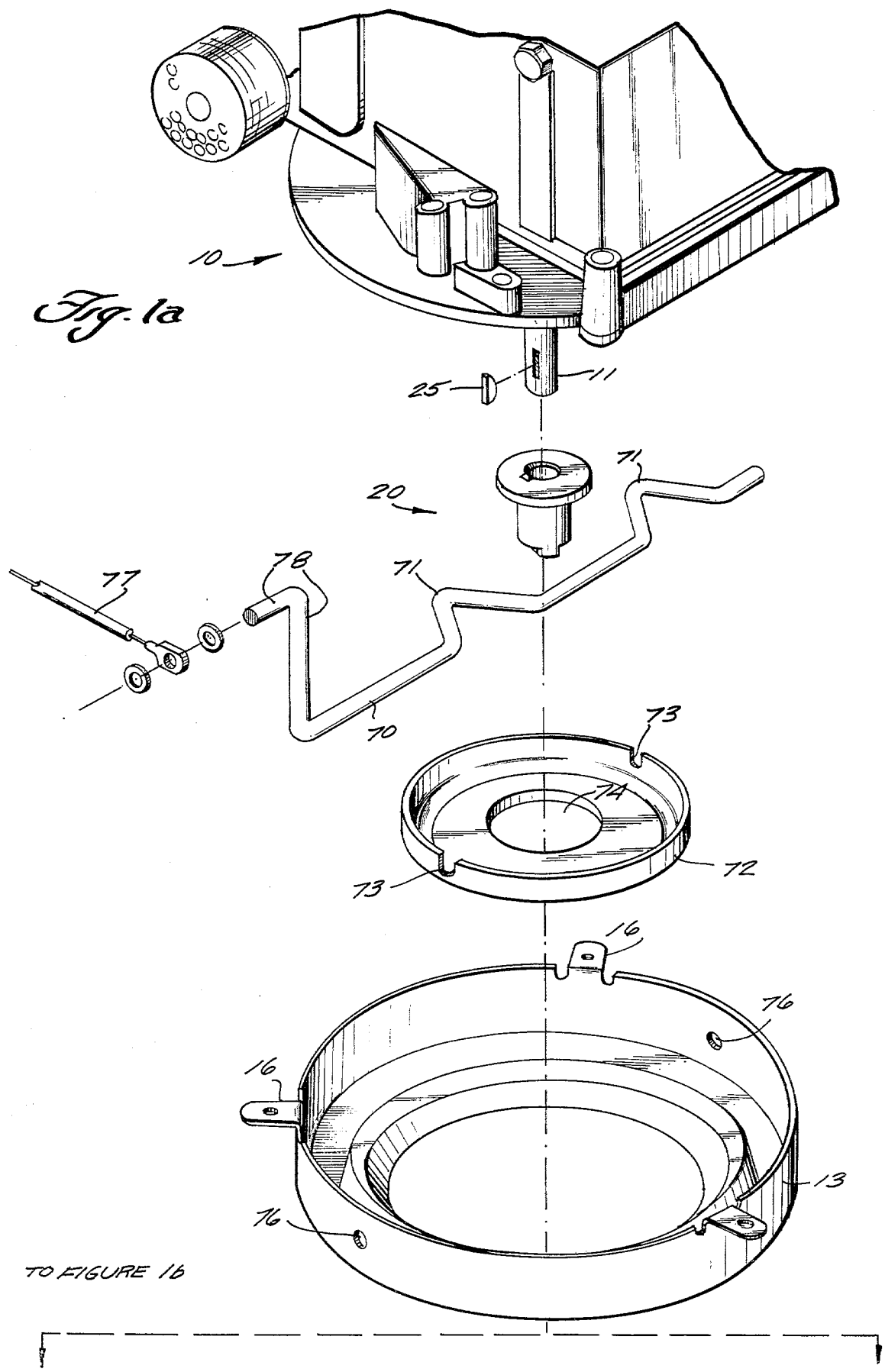

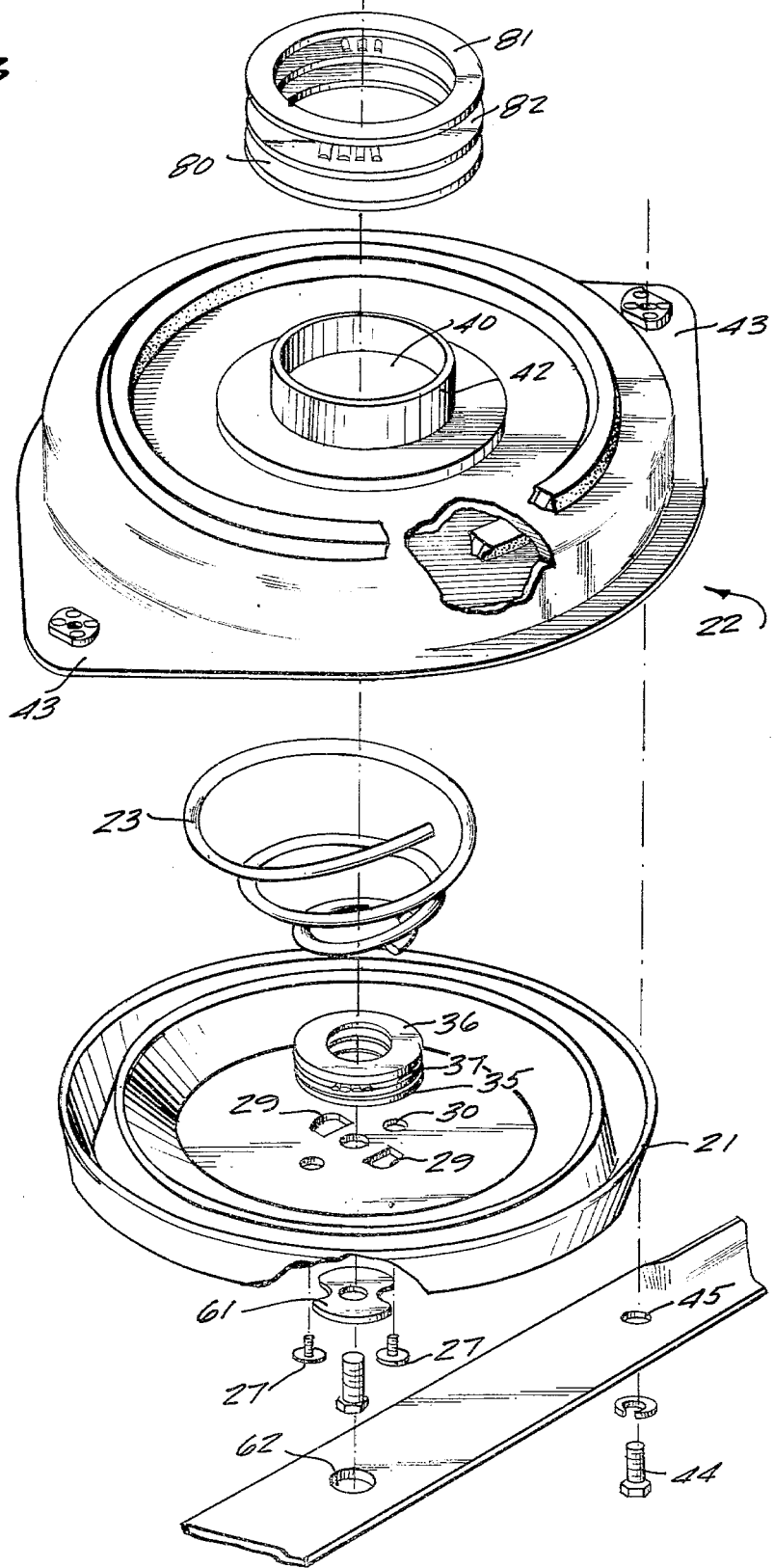

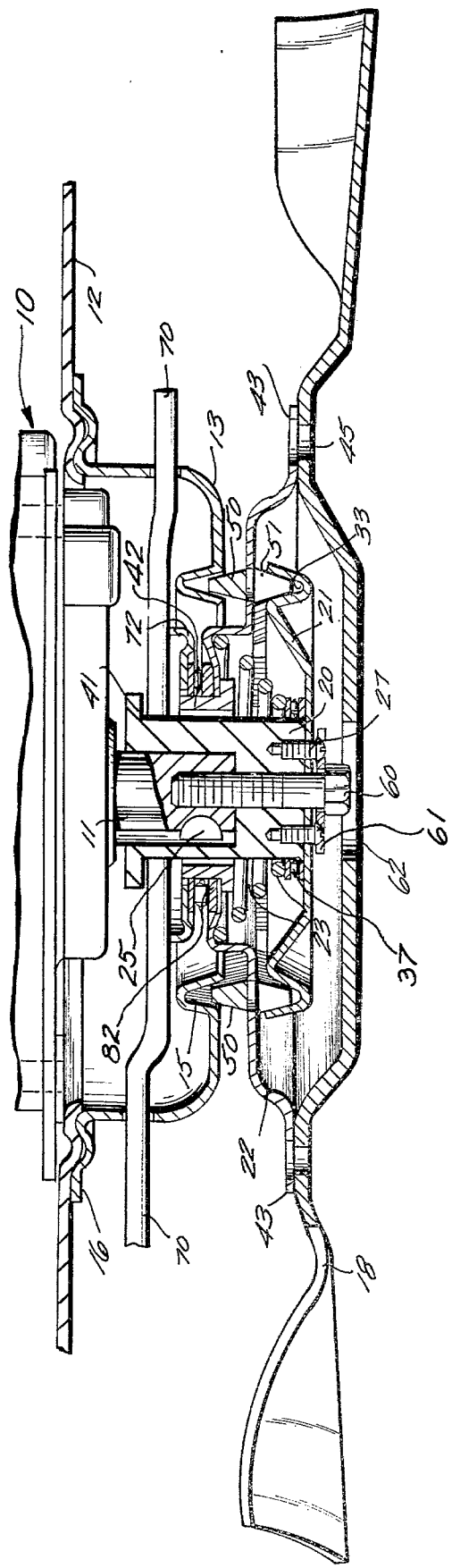

COMBINED CLUTCH AND BRAKE

BACKGROUND AND SUMMARY OF THE INVENTION

In the construction of quality rotary lawn mowers, or like devices having a working element powered by a rotating shaft, it is desirable to provide integration between the driving and braking operations. Particularly, it is desirable to effect positive braking of the working element when the driving action is terminated, and vice versa.

According to the present invention, apparatus is provided that allows desirable integration of the driving and braking functions described above, in a simple yet effective manner. The apparatus according to the present invention may be constructed utilizing a subassembly which is easy to build and easy to install and/or maintain and/or replace. There are a minimum of components, especially movable structures, and in particular the frictional surfaces providing braking and clutching are rigidly attached to a component that is rotatable and linearly movable, but need not bend or flex.

The high friction material braking and clutching elements utilized according to the present invention are annular. The annular members may be solid, having sides tapering together from a plate to which each is connected toward a point spaced from the plate. Alternatively, each annular member may comprise a pair of bands of high friction material attached to tapering surfaces. Either provides an effective substantially truncated V cross-section. The friction members have a wedging engagement with a stationary housing portion (to provide braking) or a rotatable drive plate (to provide clutching), and the construction thereof minimizes the amount of normal force necessary to perform a driving or braking action.

According to one aspect of the present invention, a power tool (such as a rotary lawn mower) comprising a housing mounting an engine, the engine powering a rotatable shaft, and a working element adapted to be driven by the rotatable shaft, is provided. A combination clutch and brake means for selectively effecting driving or braking of the working element is provided, the clutching and brake means comprising a drive plate attached to the rotatable shaft for rotation therewith and having a clutching portion; a braking portion of the housing; and adaptor plate attached to the working element and having friction material disposed on either surface thereof, the adaptor disposed between the drive plate and the housing braking portion and having a central bore therein coaxial with the rotatable shaft; and means for selectively moving the adaptor plate parallel to the axis of the rotatable shaft from a first position wherein the friction material engages the housing braking portion to effect braking of the working element, to a second position wherein the friction material engages the clutching portion to effect driving of the working element by the drive plate.

According to another aspect of the present invention, a subassembly for a power tool is provided for operatively connecting a powered rotary shaft of the power tool to a working element (such as a rotary lawn mower blade). The subassembly includes an elongated adaptor tube adapted to be operatively disposed on the powered rotary shaft of the power tool, a drive plate, releasable means (such as screws) for operatively rigidly connecting the drive plate and the adaptor tube so that they are concentric, an adaptor plate for connection to the working element and an actuation plate to cooperatively engage the adaptor plate and the drive plate. The working element may be connected to the adaptor plate as part of the subassembly. The subassembly further comprises a pair of friction members connected to the adaptor plate, one extending from each surface of the adaptor plate and one adapted to operatively engage surface means formed on the drive plate. Spring means are disposed between the adaptor plate and the drive plate to bias them apart, and a central bore is formed in the adaptor plate through which the adaptor tube passes. A collar formed on the adaptor tube and disposed on the opposite side of the actuation plate, the adaptor plate and the drive plate is dimensioned so that it cannot pass through the central bore in the actuation plate and the adaptor plate. The friction members of the subassembly preferably each comprise an annular member of high friction material having substantially a truncated V cross-section. The friction members may be integral, with one member formed as a plurality of annular segment teeth which extend through openings formed in the adaptor plate to stand proud of opposite surfaces of the adaptor plate.

According to another aspect of the apparatus according to the invention, an assembly for effecting driving or braking of a rotatable working element adapted to be driven by a powered rotatable shaft is provided. The assembly includes a housing stationary with respect to the shaft and having stationary first surface means associated therewith; a working element; means for operatively mounting the working element with respect to the rotatable shaft so that in a first position the working element operatively engages the rotatable shaft for rotation therewith, and in a second position the working element operatively engages the housing and remains stationary with respect to the shaft; and means for actuating the working element operatively mounting means for moving between the first and second positions thereof. The operatively mounting means comprises a drive plate fixed to and coaxial with the rotatable shaft and having a second surface means associated therewith; an adaptor plate fixed to the working element and coaxial with the rotatable shaft and having third and fourth surface means associated therewith, the adaptor plate mounted between the housing first surface means and the drive plate along the axis of the rotatable shaft with the third surface means aligned with the first surface means, and the fourth surface means aligned with the second surface means; and means for mounting the adaptor plate for movement parallel to the axis of the rotatable shaft in response to actuation by the actuation means, from the first position wherein the first and third surface means operatively frictionally engage each other while the second and fourth surface means operatively engage each other, to the second position wherein the first and third surface means are not operatively engaged and the second and fourth surface means operatively frictionally engage each other.

It is the primary object of the present invention to provide for simple, yet effective, driving or braking of a rotatable working element adapted to be driven by a powered rotatable shaft. This and other objects of the invention will become clear from an inspection of the detailed description of the invention, and from the appended claims.

BRIEF DESCRIPTION OF THE DRAWINGS

FIGS. 1a and 1b provide an exploded perspective view of an exemplary assembly according to the present invention;

FIG. 3 is a cross-sectional view of the apparatus of FIGS. 1a and 1b when assembled and in the driving position;

FIG. 5 is a bottom plan view of the adaptor tube illustrated in FIG. 1a.

FIG. 7 is a view like FIGS. 2 and 3 but illustrating modified forms of the assembly components.

DETAILED DESCRIPTION OF THE DRAWINGS

The invention will be herein described with reference to a rotary lawn mower, although the invention is also applicable to other power tools having powered rotatable shafts and rotatable working elements. A conventional lawn mower engine 10 (see FIG. 1a) drives a powered rotatable shaft 11, and is mounted on a stationary housing 12 (see FIG. 12) which includes a stationary housing portion 13. The housing 12 is conventionally mounted on wheels for movement along the ground in a conventional manner.

Figure 2:
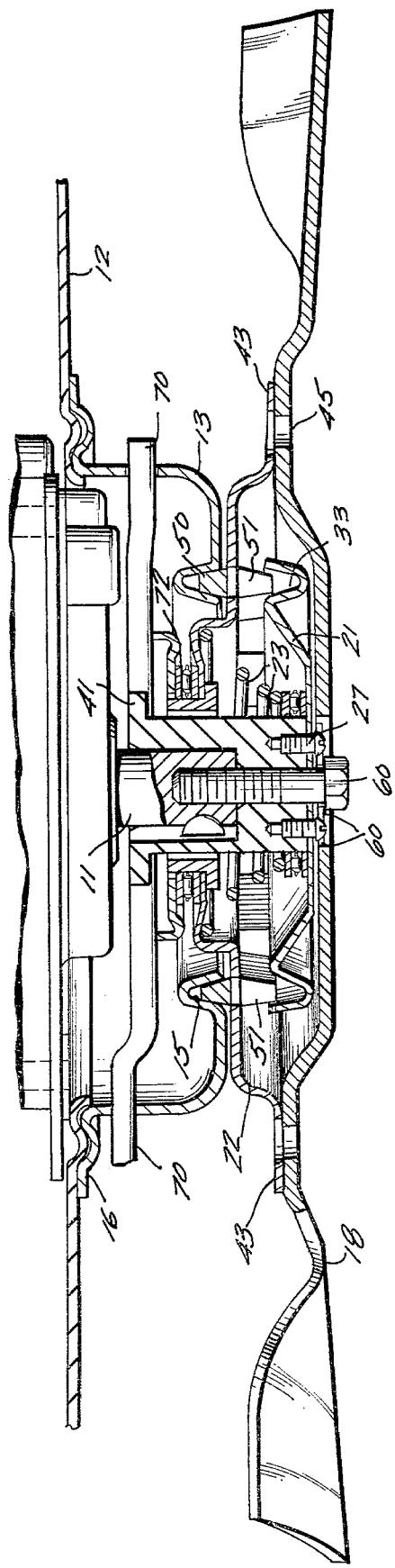
FIG. 2 is a cross-sectional view of the apparatus of FIGS. 1a and 1b when assembled and in the braking position.

The housing portion 13 is stationary with respect to the rotatable shaft 11 and has stationary first surface means 15 associated therewith, which provide a braking portion of the housing portion 13. Preferably the first surface means 15 comprises a substantially annular depression (as illustrated in FIGS. 1a, 2 and 3) having a substantially truncated V cross-sectional shape. The housing portion 13 is connected to the main housing 12 in any conventional manner, such as by bolts passing through tabs 16 and into engagement with the housing 12.

A subassembly is provided for easy connection to and cooperation with the rotatable shaft 11 and stationary housing portion 13 to provide selective braking or clutching of the lawn mower blade (working element) 18. The subassembly includes an adaptor tube 20, actuation plate 72, a drive plate 21, an adaptor plate 22, spring means (such as conical helical spring 23) disposed between the plates 21, 22 for biasing them apart, and means for releasably connecting the adaptor tube 20 to the drive plate 21. While the term "plate" is used herein, it is to be understood that the term is used in its broadest sense and encompasses all forms of structures having a generally planar configuration, although containing bends, depressions, raised portions, curved surface configurations or the like.

Figure 5:
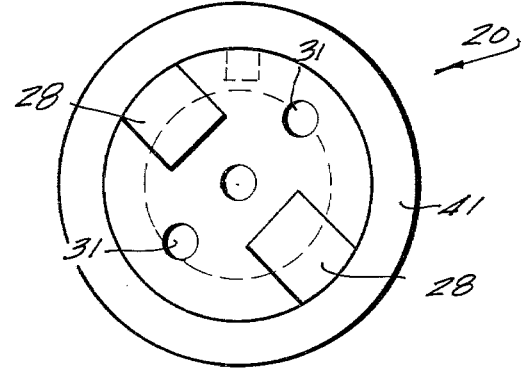

The adaptor tube 20 is designed to be keyed to the rotatable shaft 11, as with Woodruff key 25 (see FIG. 1a). The means for connecting the drive plate 21 to the adaptor tube 20 preferably includes a plurality of screws 27, a plurality of lugs 28 (see FIG. 5 in particular) on the adaptor tube 20, and a plurality of openings 29 in the drive plate 21 for receiving the lugs 28. Complimentary openings 30, 31, respectively, are provided in the drive plate 21 and adaptor tube 20, respectively, for receipt of the screws 27.

The drive plate 21 has second surface means 33 associated therewith providing a clutching portion of the drive plate 21. Such surface means 33 preferably have the same general configuration as the annular truncated V depression forming the first surface means 15, as can be seen by an inspection of FIGS. 2 and 3. Bearing means comprising a pair of thrust washers 35, 36 sandwiching a thrust bearing 37, are preferably provided between the drive plate 21 and the small diameter portion of the spring 23 to allow relative rotation between the members 21, 23.

The adaptor plate 22 has a central bore 40 formed therein through which the body of the adaptor tube 20 may pass. A collar or flange 41 on the adaptor tube, however, is dimensioned so that it cannot pass through the central bore 40 of adaptor plate 22 or actuation plate 72. A collar 42 may be provided on adaptor plate 22 defining the central bore 40, and acting in conjunction with adaptor tube 20, and spring means 23 to provide linear movement of the adaptor plate 22 with respect to the rotatable shaft 11 when the apparatus is assembled. The adaptor plate 22 further comprises a pair of ears 43. Bolts 44 pass through openings 45 in the blade 18 to operatively engage the ears 43 and rigidly attach the blade 18 to the adaptor plate 22. The blade 18 may be connected to the ears 43 to provide part of the subassembly, or need not comprise part of the subassembly.

Figure 4:
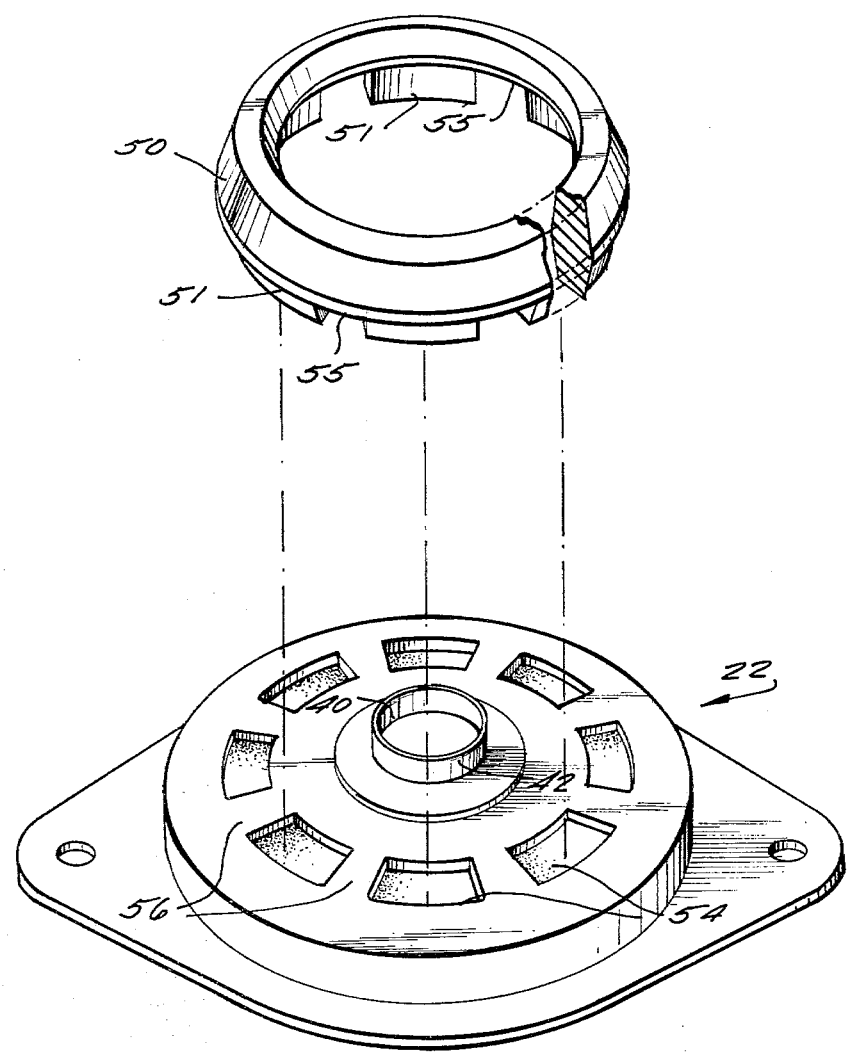
FIG. 4 is a detail, exploded perspective view of the preferred embodiment of the friction members according to the present invention shown in conjunction with the preferred adaptor plate.

According to the present invention, third and fourth surface means are provided associated with the adaptor plate 22 to engage the first and second surface means 15, 33, respectively, to effect braking or clutching action, respectively. Such surface means preferably comprise the substantially annular members 50, 51 of high friction material, such as asbestos compositions. While it is preferred that the entire annular members 50, 51 be constructed of such high friction material, under some circumstances they merely may have the working surfaces thereof covered or coated with high friction material. Each of the annular members 50, 51 has sides tapering together from the plate 22 to an imaginary point above the plate; that is, they have substantially a truncated V cross-sectional shape. Such a shape, in cooperation with the shapes of the surface means 15, 33, provides a dual surface engaging action in the braking and clutching positions, which minimizes the amount of normal force required to perform the braking or driving action. Preferably the members 50, 51 are integral, as illustrated most clearly in FIG. 4. One of the members (member 50 in the drawings) is continuous while the other member (member 51 in the drawings) is discontinuous, being defined by a plurality of annular segment teeth which extend through complimentary shaped openings 54 in the adaptor plate 22 to extend upwardly from the opposite face of the adaptor plate 22 as the member 50. In order to positively secure the members 50, 51 to the adaptor plate 22, preferably adhesive is applied between the undersurface portion 55 (see FIG. 4) of the member 50 and the spaces 56 on the adaptor plate 22 between the openings 54.

The subassembly comprising the adaptor tube 20, actuation plate 72, drive plate 21, adaptor plate 22, spring means 23, thrust washers 35, 36, 80, 81, bearings 37, 82, screws 27, and optionally the blade 18, may be readily connected to the rotating shaft 11. This is accomplished, in addition to using the Woodruff key 25, by using hex bolt 60, and notched washer 61 (a lock washer, not shown, also may be associated with bolt 60). An opening 62 is provided in blade 18 larger than the head of the hex bolt 60, and also preferably large enough to receive a socket from a socket wrench, or other tool, therein. The washer 61 is notched so that it clears the heads of the screws 27, and also may be contoured to provide clearance for the screw heads. The threaded portion of hex bolt 60 is received by a threaded interior bore formed in the shaft 11.

Means are also provided for actuating the brake-clutching function. In the form of the invention illustrated in the drawings, the actuating means includes a control rod 70 having a pair of off-axis-extending sections 71 (see FIG. 1a) and an actuation plate 72 which is operatively attached to the sections 71 of rods 70 at cut-outs 73. The central bore 74 of the plate 72 allows passage of the adaptor tube 20 therethrough, being trapped under the collar 41 of adaptor tube 20. Means are provided for mounting the control rod 70 to the housing 13 so that the control rod is rotatable about an axis substantially perpendicular to the shaft 11, and so that the actuation plate 72 operatively engages the adaptor plate 72 (through a bearing means). Such mounting means for the control rod include the bores 76 in the housing 13. The control rod 70 can be threaded or snaked through the opening 76. The actuator means further comprises a control member, such as the cable 77, which engages actuating portions 78 of control rod 70 to effect rotation of the control rod 70 about its axis, whicn in turn results in linear movement of the actuation plate 72 parallel to the shaft 11. Any suitable conventional operating lever or the like may be provided for the cable 77, such as one located on the handle of the lawn mower.

In order to allow relative rotation between the adaptor plate 22 and the actuation plate 72, bearing means are provided between the plates 22, 72. Such bearing means may include the thrust washers 80, 81 and the thrust bearing 82, all of which may be disposed over the collar 42 of plate 22.

Figure 6:
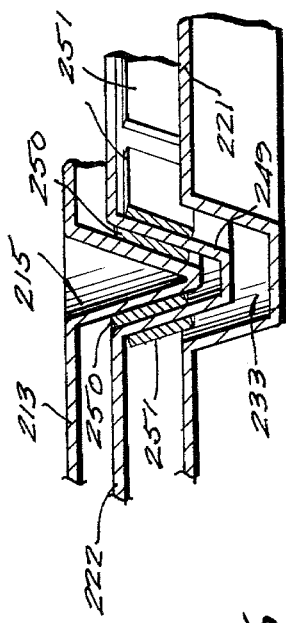
FIG. 6 is a detail cross-sectional view illustrating a modified form of friction members according to the invention.

Many of the components of the apparatus according to the present invention may assume different forms than described above with respect to FIGS. 1–5. Various modifications within the scope of the present invention are illustrated in FIGS. 6 and 7. Reference numerals in FIGS. 6 and 7 corresponding to identical structures in FIGS. 1–5 are given the same reference numeral, and slightly modified structures are given the same reference numeral as corresponding structures in FIGS. 1–5 preceded by a "1" or "2".

In the arrangement illustrated in FIG. 7, the bearing means, adaptor plate, and actuating plate have been slightly modified vis a vis the embodiment illustrated in FIGS. 1–5. The bearing means 137 and 182 comprise complete roller bearing assemblies, contained by outer casings 135 and 180, respectively. Such integral assemblies make installation of the bearing means simpler during initial construction or repair. Additionally, a plate 136 is provided associated with bearing means 137 for providing a seat for the small diameter of spring 23, having upturned end portions positively seating the spring. Further, the actuating plate 172 includes a downturned lip 175 providing for positive seating of the bearing means 182 with respect to the actuation plate 172. In this embodiment the adaptor plate 182 also has a slightly different configuration adapted for accommodate the different configuration of the bearing means 182, as clearly illustrated in FIG. 7.

FIG. 6 illustrates a modification of the first, second, third, and fourth surface means according to the present invention for providing the actual breaking or clutching function. In FIG. 6, the annular friction members 250, 251 are formed as a pair of bands of friction material. The adaptor plate 222 is formed with a ridge 249 which defines a projection from one face of the plate 222 in a depression in the other face of the plate 222. The bands 250 are disposed in the depression, and the bands 251 are disposed on the projection, formed by the ridge 249. In this embodiment, the housing portion 213 includes first surface means 215 formed as an annular projection rather than an annular depression as in the FIGS. 1–5 embodiment. Drive plate 221 is similar in construction to the drive plate 21 in the FIGS. 1–5 embodiment, except that the second surface means 233 comprises a depression of slightly different shape in order to better accommodate the fourth surface means formed by bands 251. In this embodiment, less high friction material is employed than in the FIGS. 1–5 embodiment.

Exemplary apparatus according to the present invention having been described, an exemplary manner of assembly and operation thereof will now be set forth with respect to the FIGS. 1–5 embodiment:

In assembling the apparatus, the housing 13 is attached to the main housing 12 (utilizing fasteners passing through tabs 16) in the position illustrated in FIGS. 2 and 3, the actuation plate 72 is disposed within the central opening of housing 13 defined by the first surface means 15, and the control rod 70 is snaked through the opening 76 in housing 13 and the off-axis-extending sections 71 thereof may be brought into engagement with the receiving apparatus 73 of the actuation plate 72.

The braking-clutching subassembly is formed by disposing thrust washers and bearing 35, 36, 37 on the top surface of the drive plate 21, inserting the small diameter portion of the conical helical spring 23 into contact with the top of thrust washer 36, and placing adaptor plate 22 so that it engages the large diameter portion of the spring 23. The thrust washers and bearings 80, 81 and 82 and actuation plate 72 are slipped over the collar 42 of adaptor plate 22, and then the body of tubular adaptor 20 is passed through the bore 40 until the lugs 28 engage the openings 29 in the drive plate 21. Then the screws 27 are passed through the openings 30, 31 and tightened down. In this form of the subassembly, the spring 23 biases the plates 22, 21 apart, but collar 41 is so dimensioned with resect to opening 40 and thrust washer 81 that the assembly will not come apart. Then, if desired, the blade 18 may be attached to the adaptor plate 22 tabs 43, as with bolts 44 passing through openings 45 in the blade 18.

Once the subassembly is completed, the subassembly is moved into operative engagement with the rotating shaft 11 by passing the tubular adaptor 20 over the shaft 11 and utilizing key 25, and by placing notched washer 61 in engagement with the bottom of plate 21 and threading hex bolt 60 into engagement with the shaft 11 while insuring sections 71 of rod 70 engage the receiving apparatus 73 of actuation plate 72. The assembly is now complete.

In operation of the apparatus, the spring 23 normally biases the plate 22 upwardly so that the frictional member 50 frictionally engages the first surface means 15 and holds the blade 18 so that it cannot rotate. The thrust washers 35, 36 and thrust bearing 37 allow relative rotation between the spring 23 and the drive plate 21, which is rotated whenever the shaft 11 is rotated. To effect clutching action, the operator actuates control cable 77, which in turn rotates control rod 70 about a horizontal axis so that the sections 71 thereof push the actuation plate 72 downwardly. Downward movement of the actuator plate 72 effects downward movement of the adaptor plate 22 against the bias of spring 23, to move the frictional member 50 out of engagement with the first surface means 15, and move the frictional member 51 into operative frictional engagement with the second surface means 33 of the drive plate 21 (FIG. 3). In this position, the plate 22 and blade 18 are driven along with the drive plate 21 by the shaft 11. Relative rotation between the adaptor plate 22 and actuation plate 72 is allowed by the bearing means 80, 81, 82. When the control cable 77 is moved back to the braking position, the spring 23 forces the adaptor plate 22 back to its original braking position (FIG. 2).

It will thus be seen that according to the present invention a simple yet effective braking-clutching action has been provided for a rotary lawn mower or the like. The apparatus according to the present invention has a minimum number of parts, is easy to assemble, ship, service, and/or replace, and the amount of normal force required to perform a driving or braking action is minimized. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent assemblies and devices.

What is claimed is:

1. An assembly for effecting driving or braking of a rotatable working element adapted to be driven by a powered rotatable shaft comprising:

a housing stationary with respect to said shaft and having stationary first surface means associated therewith;

a working element;

means for operatively mounting said working element with respect to said rotatable shaft so that in a first position said working element operatively engages said rotatable shaft for rotation therewith, and in a second position said working element operatively engages said housing and remains stationary with respect to said shaft;

means for actuating said working element operatively mounting means for moving it between said first and second positions thereof; and said operatively mounting means comprising a drive plate disposed between said housing and said working element, and fixed to and coaxial with said rotatable shaft and having second surface means associated therewith; an adapter plate fixed to said working element and coaxial with said rotatable shaft and having third and fourth surface means associated therewith, said adaptor plate mounted between said housing first surface means and said drive plate along the axis of said rotatable shaft with said third surface means aligned with said first surface means, and said fourth surface means aligned with said second surface means; and means for mounting said adaptor plate for movement parallel to the axis of said rotatable shaft in response to actuation by said actuation means, from said first position wherein said first and third surface means operatively frictionally engage each other and said second and fourth surface means do not operatively engage, to said second position wherein said first and third surface means are not operatively engaged and said second and fourth surface means operatively frictionally engage each other.

2. An assembly as recited in claim 1 wherein said third and fourth surface means comprise projections of high-friction material, and said first and second surface means comprise depressions shaped complimentary to said projections.

3. An assembly as recited in claim 2 wherein said projections each comprise a substantially annular member having opposite sides that taper toward each other, providing substantially a truncated V in cross-section.

4. An assembly as recited in claim 3 wherein said projections are integral with each other, and wherein one of said projections comprises a discontinuous annular member having solid portions passing through openings formed in said adaptor plate to extend from one surface of said adaptor plate perpendicular to said rotatable shaft to another surface of said adaptor plate parallel to said one surface to stand proud of said another surface.

5. An assembly as recited in claim 4 further comprising adhesive attaching said projections to said adaptor plate, and wherein said fourth surface means comprises said discontinuous annular member, and wherein said third surface means comprises a continuous annular member.

6. An assembly as recited in claim 1 wherein one of said first and third surface means, and one of said second and fourth surface means, comprises a substantially annular member of high-friction material providing a truncated V in cross-section.

7. An assembly as recited in claims 1, 3 or 6 further comprising biasing means for biasing said first and third surface means into frictional engagement with each other unless the bias of said biasing means is overcome by said actuator means.

8. An assembly as recited in claims 1, 3 or 6 further comprising first bearing means disposed between said actuating means and said adaptor plate to allow relative rotation therebetween.

9. An assembly as recited in claim 8 further comprising spring means disposed between said drive plate and said adaptor plate for normally biasing them apart, and second bearing means disposed between said drive plate and said spring means to allow relative rotation therebetween.

10. An assembly as recited in claim 8 wherein said actuating means comprises a control rod having a pair of off-axis-extending sections; an actuation plate operatively attached to said off-axis-extending sections of said control rod; means for mounting said control rod to said housing so that said control rod is rotatable about an axis substantially perpendicular to said rotatable shaft and so that said actuation plate operatively engages said adaptor plate; and a control member for effecting rotation of said control rod; and wherein said first bearing means comprises a first thrust washer abutting said actuating plate, a second thrust washer abutting said adaptor plate, and a thrust bearing disposed between said first and second thrust washers.

11. An assembly as recited in claim 1 wherein said working element is a rotary lawn mower blade, and wherein said powered rotatable shaft is powered by a lawn mower engine, and wherein said housing is a lawn mower housing mounted on wheels and mounting said engine.

12. An assembly as recited in claim 1 wherein said adaptor plate includes an annular ridge formed therein providing a generally V-shaped projection extending from one face of said plate, and a generally V-shaped depression extending into the opposite face of said plate; and wherein said third and fourth surface means comprise two annular bands of high-friction material affixed to each of said ridge depression and projection, respectively; and wherein said first surface means comprises a generally V-shaped annular projection adapted to extend into said adaptor plate annular ridge depression; and wherein said second surface means comprises a generally V-shaped depression formed on said drive plate and adapted to receive said adaptor plate annular ridge projection.

13. An assembly as recited in claim 12 wherein said annular bands of high-friction material are discontinuous over the entire extent of said ridge projection and depression.

14. A subassembly for a power tool for operatively connecting a powered rotary shaft of the power tool to a working element, said subassembly comprising
an elongated adaptor tube adapted to be operatively disposed on a powered rotary shaft of a power tool;
a drive plate having surface means associated therewith, and extending substantially perpendicular to the dimension of elongation of said tube;
releasable means for operatively rigidly connecting said drive plate and said adaptor tube so that they are concentric;
an adaptor plate adapted to be operatively connected to a working element of a power tool and extending substantially parallel to said drive plate;
a pair of friction members connected to said adaptor plate one extending from each surface of said adaptor plate and one adapted to operatively frictionally engage said surface means on said drive plate;
spring means disposed between said adaptor plate and said drive plate to bias them apart;
means defining a central bore in said adaptor plate through which said adaptor tube passes; and
a collar formed on said adaptor tube and disposed on the opposite side of said adaptor plate as said drive plate, said collar dimensioned so that it cannot pass through said central bore in said adaptor plate.

15. A subassembly as recited in claim 14 wherein said adaptor plate includes an annular ridge formed therein providing a generally V-shaped projection extending from one face of said plate and a generally V-shaped depression extending into the opposite face of said plate; and wherein said friction members comprise two pairs of annular bands of high-friction material, one pair of bands affixed to said adaptor plate in said depression, and one pair of bands affixed to said adaptor plate on said projection.

16. A subassembly as recited in claim 14 wherein said releasable means comprises a plurality of screws extending through screw holes formed in said drive plate and into said adaptor tube along the dimension of elongation of said adaptor tube; a plurality of driving lugs formed on said adaptor tube extending in the dimension of elongation thereof; and means defining a plurality of driving lug receiving openings in said drive plate for receipt of said driving lugs.

17. A subassembly as recited in claim 14 wherein said spring means comprises a conical helical spring.

18. A subassembly as recited in claim 14 further comprising bearing means disposed between said drive plate and said spring means to allow relative rotation therebetween.

19. A subassembly as recited in claim 14 wherein said friction members are integral, one of said members being discontinuous and extending through opening in said adaptor plate from one face of said plate to the other.

20. A subassembly as recited in claims 14 or 19 wherein each of said friction members comprises a substantially annular member providing a truncated V in cross-section.

21. A subassembly as recited in claim 14 wherein said adaptor plate comprises a plurality of radially outwardly extending ears, and wherein said subassembly further comprises a working element for a power tool having means defining a central bore therein concentric with said adaptor tube and large enough to allow passage of a fastener therethrough for fastening said drive plate to said shaft; and means for connecting said working element to said adaptor plate ears.

22. A subassembly as recited in claim 21 wherein said working element is a rotary lawn mower blade.

23. A power tool comprising: a housing mounting an engine, the engine powering a rotatable shaft; a working element adapted to be driven by said rotatable shaft; and a combination clutch and brake means for selectively effecting driving or braking of said working element, said combination clutch and brake means comprising:
a drive plate attached to said rotatable shaft for rotation therewith and having a clutching portion;
a braking portion of said housing;
an adaptor plate attached to said working element and having friction material disposed on either surface thereof, the adaptor plate disposed between the drive plate and the housing braking portion and having a central bore therein coaxial with said rotatable shaft, said friction material comprising a ring of friction material upstanding from each of the surfaces of said adaptor plate, said rings of friction material being integral with each other, and one of said rings being discontinuous, having a plurality of annular segment teeth extending through openings formed in said adaptor plate from one surface of said adaptor plate to the other;
means for selectively moving said adaptor plate parallel to the axis of said rotatable shaft from a first position wherein said friction material engages said housing braking portion to effect braking of said working element, to a second position wherein said friction material engages said clutching portion to effect driving of said working element by said drive plate; and
said housing braking portion and said drive plate clutching portion each comprising a depression formed to receive a said ring of friction material.

24. A braking and clutching assembly comprising:
a first component having a first annular generally V-shaped surface manifestation;
a second component having a second annular generally V-shaped surface manifestation; and
a third component having two opposite surfaces and having an annular generally V-shaped surface manifestation associated with each surface comprising third and fourth surface manifestations comprising solid projections of high-friction material;

said first and second surface manifestations comprising depressions dimensioned and shaped to receive said solid projections; and wherein at least two of said first, second, third and fourth surface manifestations include at least in part high-friction material on both legs of the V thereof so that when said first and third surface manifestations operatively engage, or said second and fourth surface manifestations operatively engage, no relative rotary movement between the engaging surface manifestations is allowed.

25. A power tool comprising: a housing mounting an engine, the engine powering a rotatable shaft; a working element adapted to be driven by said rotatable shaft; and a combination clutch and brake means for selectively effecting driving or braking of said working element, said combination clutch and brake means comprising:

a drive plate attached to said rotatable shaft for rotation therewith and having a clutching portion;

a braking portion of said housing;

an adaptor plate attached to said working element and having friction material disposed on either surface thereof, the adaptor plate disposed between the drive plate and the housing braking portion and having a central bore therein coaxial with said rotatable shaft, said friction material comprising a ring of friction material upstanding from each of the surfaces of said adaptor plate, said rings of friction material comprising two pairs of bands of friction material;

said adaptor plate comprising an annular ridge formed therein providing an annular V-shaped projection extending from one surface of said plate, and an annular V-shaped depression extending into the opposite surface of said plate, said bands of friction material being associated with said adaptor plate surfaces on said projection and in said depression;

means for selectively moving said adaptor plate parallel to the axis of said rotatable shaft from a first position wherein said friction material engages said housing braking portion to effect braking of said working element, to a second position wherein said friction material engages said clutching portion to effect driving of said working element by said drive plate; and said housing braking portion and said drive plate clutching portion each comprise an annular V-shaped depression formed to receive a ring of friction material.

26. A braking and clutching assembly comprising:

a first component having a first annular generally V-shaped surface manifestation;

a second component having a second annular generally V-shaped surface manifestation; and a third component having two opposite surfaces and having an annular generally V-shaped surface manifestation associated with each surface comprising third and fourth surface manifestations comprising bands of high-friction material disposed on the surfaces of a depression formed in said third component and a projection formed from said third component, respectively; and wherein at least two of said first, second, third and fourth surface manifestations include at least in part high-friction material on both legs of the V thereof so that when said first and third surface manifestations operatively engage, or said second and fourth surface manifestations operatively engage, no relative rotary movement between the engaging surface manifestations is allowed.

* * * * *